United States Patent [19]
May, Sr. et al.

[11] 4,038,188
[45] July 26, 1977

[54] METHOD FOR PREVENTING EUTECTIC CAKING OF SODIUM CHLORIDE AT HIGH TEMPERATURES

[75] Inventors: James A. May, Sr.; Gerard C. Sinke; Martin A. Langhorst, all of Midland, Mich.

[73] Assignee: The Dow Chemical Company, Midland, Mich.

[21] Appl. No.: 558,402

[22] Filed: Mar. 14, 1975

[51] Int. Cl.² .............................................. B01D 57/00
[52] U.S. Cl. ...................................... 210/20; 110/1 J; 210/71; 432/15
[58] Field of Search .................. 110/1 J, 8 F; 210/20, 210/63, 67, 68, 71, 152; 423/551, 552, 554, 555; 432/2, 15, 27

[56] References Cited

U.S. PATENT DOCUMENTS

| | | | |
|---|---|---|---|
| 3,309,262 | 3/1967 | Copeland et al. | 162/30 R |
| 3,319,586 | 5/1967 | Albertson et al. | 110/8 F |
| 3,873,672 | 3/1975 | Nishiba et al. | 423/551 |
| 3,907,674 | 9/1975 | Roberts et al. | 210/20 |

Primary Examiner—Thomas G. Wyse
Assistant Examiner—Ivars Cintins
Attorney, Agent, or Firm—G. H. Korfhage; J. M. Kuszaj

[57] ABSTRACT

A body of particles of sodium chloride (1) initially containing sodium sulfate and/or sodium carbonate, and/or (2) exposed to compounds capable of reacting in situ with the sodium chloride and/or with each other to form sodium sulfate and/or sodium carbonate, is maintained free from caking at temperatures within the range of from about 610° C to at least about 700° C by maintaining such a body substantially free from sodium sulfate and/or sodium carbonate. One or more compounds, at least one of which contains calcium ion, are provided in the system to react with any sodium sulfate and sodium carbonate present in the system initially, and with any compounds in the system which would otherwise react to form sodium sulfate and/or sodium carbonate. One aspect of this invention enables the operation of a fluidized bed reactor at more efficient operating temperatures than previously attainable in the incineration of organic matter contained in an aqueous sodium chloride brine over a bed of sodium chloride fluidized by gases from the combustion of sulfur-containing fossil fuels and fuel oils.

21 Claims, No Drawings

METHOD FOR PREVENTING EUTECTIC CAKING OF SODIUM CHLORIDE AT HIGH TEMPERATURES

BACKGROUND OF THE INVENTION

A. Field of the Invention

This invention relates to a method for preventing caking of a body of granulated sodium chloride particles containing, or in an environment conducive to the formation of, sodium sulfate and/or sodium carbonate impurities, while the body of particles in maintained within the temperature range of from about 610° C to at least about 700° C. One particular aspect of this method provides an improvement in incineration processes utilizing a fluidized bed of sodium chloride by permitting higher, more efficient operating temperatures.

B. Description of the Prior Art

It is known in the art to dispose of organic waste contained in aqueous effluent streams also containing inorganic solids, by incineration in or over a bed of fluidized granular material. See, for example, Copeland et al, U.S. Pat. No. 3,309,262; Albertson et al, U.S. Pat. No. 3,319,586; and Mallat et al, "Incinerate Sludge and Caustic," *Hydrocarbon Processing*, pp. 121-122, May, 1970.

To briefly summarize such incineration processes, a bed of particles is maintained in a dense turbulent suspension in an upflowing stream of a hot, oxygen containing gas. Typically, the hot oxygen containing gas is at least partially comprised of gases from the combustion of a sulfur containing fuel in air, and therefore contains carbon dioxide, sulfur dioxide, and water vapor in addition to oxygen. The waste stream to be disposed of is customarily sprayed into the bed itself or into the so-called freeboard above the bed. Upon contact with the bed the organic components are oxidized to water, carbon dioxide, and the like, and are vented to the atmosphere along with water vapor from the aqueous portion of the waste stream. The solid inorganic material remaining becomes part of the bed itself. Portions of the bed are removed as the process continues, to compensate for the addition of the solid inorganics from the waste stream. Although an inert material, such as sand, may be used for the bed during start-up, it is apparent that at least after a period of operation, the bed will have a composition substantially corresponding to the inorganic portion of the waste stream.

While the teachings of the prior art appear to be generally applicable to a wide variety of waste streams, a particular problem has heretofore been encountered when attempts were made to incinerate a sodium chloride based stream containing organic matter. A typical effluent stream from a methylcellulose plant for example, is a sodium chloride brine stream containing such organics as glycols and glycol ethers as well as traces of methylcellulose. Although partial oxidation of the organic compounds occurs at somewhat lower temperatures, it is most efficient to incinerate such a waste stream at temperatures within the range of from about 650° C to about 680° C. Prior to the invention hereinafter described and claimed, however, sodium chloride bed temperatures much in excess of about 600° C could not be sustained. At temperatures slightly above 600° C, caking, i.e., agglomeration or conglomeration of the bed particles, began to occur.

DEFINITION

By "body of sodium chloride particles," "body of particulate sodium chloride," "body of granular sodium chloride," and similar expressions is meant a body of distinct particles, said body being comprised of at least about 75 weight percent sodium chloride.

SUMMARY OF THE INVENTION

In accordance with the present invention, a method is provided for maintaining a body of particles of sodium chloride free from caking at temperatures within the range of from about 610° C to at least about 700° C where the body (1) initially contains, in addition, sodium sulfate and/or sodium carbonate, and/or (2) is maintained in an environment containing components capable of reacting with sodium chloride and/or with one another to form sodium sulfate and/or sodium carbonate. The crux of the invention lies in maintaining the body of sodium chloride substantially free from sodium sulfate and sodium carbonate impurities during the time the body is at a temperature within the above defined range. This is accomplished by providing in the system one or more compounds, at least one of which contains calcium ion, to react with any sodium sulfate and sodium carbonate present in the system initially, and with any components in the system which would otherwise react to form sodium sulfate and/or sodium carbonate. The corresponding calcium impurities —calcium sulfate and calcium carbonate—are formed instead of the sodium sulfate and sodium carbonate, although the calcium carbonate may react with sulfur containing compounds to form additional calcium sulfate. To avoid unnecessary contamination of the sodium chloride and damage to the apparatus from acidic by-products, it is definitely preferred that the compounds employed be selected and provided in amounts such that the net reaction products consist substantially of sodium chloride, calcium chloride, calcium sulfate, calcium carbonate, water, and/or carbon dioxide.

The principle of the invention has been applied to achieve fluidized bed incineration of organic components in sodium chloride-based waste brine streams at higher, more efficient operating temperatures than previously possible. Those skilled in the art will also recognize that the priciples of the invention apply equally well to processes other than incineration, e.g., calcining, and in apparatus other than a fluidized bed reactor, e.g., a rotary kiln, wherein it is desired to maintain separate particles of sodium chloride within the stated temperature range using hot gases containing, e.g., water vapor, sulfur dioxide, and carbon dioxide.

FURTHER DESCRIPTION OF THE INVENTION

Although much of the discussion which follows is in terms of a fluidized bed of sodium chloride particles, the particular context is merely illustrative of a wide variety of applications as mentioned in the preceding paragraph. The underlying principles of the invention, however, are such that those skilled in the art will have no difficulty in employing the inventive concept in other areas based on the teachings herein. Accordingly, except where a claim contains language specifically limited to incineration or to a fluidized bed, the claims should not be construed as so limited.

The caking experienced in bodies of sodium chloride particles at temperatures in excess of about 600° C is believed attributable to the presence of sodium sulfate and/or sodium carbonate impurities. Apparently, NaCl/Na₂SO₄, NaCl/Na₂CO₃, and/or NaCl/Na₂SO₄/Na₂CO₃ eutectic melting occurs. Regardless of whether the eutectic melting theory is accurate, the thrust of the present invention lies in the discovery that by forming the corresponding calcium sulfate and, at least as an intermediate, calcium carbonate, rather than the respective sodium impurities, the caking phenomenon believed caused by eutectic melting is avoided up to temperatures of at least about 700° C.

The principle and practice of the present invention are easily understood by consideration of a few illustrations. It is to be understood that the reactions set forth herein represent net reactions, and that the invention is not limited to any particular reaction mechanism. Indeed, one net reaction may very well result from several different mechanisms occurring simultaneously.

Present initially.

In the situation where sodium chloride also containing sodium sulfate and sodium carbonate is fluidized with a gas such as nitrogen which is inert with respect to the inorganic components of the bed, the only concern is converting the existing sodium impurities to their respective calcium impurities. This is accomplished by employing at least a stoichiometric amount of calcium chloride according to the following reactions:

$$Na_2SO_4 + CaCl_2 \rightarrow 2NaCl + CaSO_4 \quad \text{(Rx. I)}$$

and $$Na_2CO_3 + CaCl_2 \rightarrow CaCO_3 + 2NaCl. \quad \text{(Rx. II)}$$

(By naming a compound herein, both the anhydrous form and any hydrates thereof are included, such as CaCl₂·H₂O.)

Sodium sulfate can also be converted to calcium sulfate according to the reaction $$Na_2SO_4 + CaCO_3 \rightarrow CaSO_4 + Na_2CO_3, \quad \text{(Rx III)}$$

but it is not recommended since sodium carbonate is also formed. Since calcium chloride is then required to react with the sodium carbonate according to Rx. II, the net result is the same as if calcium chloride had been employed alone, except that an additional unit of CaCO₃ is added to the bed and remains as an impurity.

Formed in situ.

Where the sodium chloride is maintained in an environment containing components which react with one another or with the sodium chloride to form sodium sulfate and/or sodium carbonate, components must be provided in the system which competitively react to form compounds other than sodium sulfate and/or sodium carbonate, or, equivalently, which immediately convert the sodium sulfate and/or carbonate to the corresponding calcium compounds. A typical example of such a system is where sodium chloride is fluidized by gases containing the products of combustion of sulfur-containing fuels. Combustion products from such fuels contain sulfur dioxide, oxygen, water, and carbon dioxide. In the absence of preventative measures, sodium sulfate is formed as follows:

$$SO_2 + 1/2O_2 + H_2O + 2NaCl \rightarrow Na_2SO_4 + 2HCl. \quad \text{(Rx. IV)}$$

By providing an appropriate amount of calcium carbonate, calcium sulfate is formed instead:

$$SO_2 + 1/2O_2 + CaCO_3 \rightarrow CaSO_4 + CO_2. \quad \text{(Rx. V)}$$

The calcium carbonate may actually be added to the system, or, if the system was provided with calcium carbonate as a result of treatment of sodium carbonate in the system initially, an actual addition of calcium carbonate will not be necessary until the calcium carbonate already provided in the system by Rx. II is consumed.

Formation of sodium sulfate is prevented using calcium chloride as follows:

$$SO_2 + 1/2O_2 + H_2O + CaCl_2 \rightarrow CaSO_4 + 2HCl. \quad \text{(Rx. VI)}$$

Hydrogen chloride, however, is generally undesirable, so that this approach is preferably employed only where a sufficient amount of base is provided to neutralize the HCl. If certain bases such as sodium hydroxide are employed, however, care must be taken—at least in the absence of excess calcium chloride—since any excess base may react to form sodium carbonate:

$$2NaOH + CO_2 \rightarrow Na_2CO_3 + H_2O. \quad \text{(Rx. VII)}$$

Where excess calcium chloride is present, any excess sodium hydroxide will be converted to calcium carbonate, either by Rx. VII followed by Rx. II, or by Rx. VIII followed by Rx. IX:

$$CaCl_2 + 2NaOH \rightarrow Ca(OH)_2 + 2NaCl \quad \text{(Rx. VIII)}$$

$$Ca(OH)_2 + CO_2 \rightarrow CaCO_3 + H_2O. \quad \text{(Rx. IX)}$$

Sodium carbonate and bicarbonate can also be used as bases with calcium chloride. Taking sodium carbonate as an example, calcium sulfate is formed from sulfur dioxide, oxygen, and water, for example, perhaps by Rx. II followed by Rx. V, or equivalently, by $$SO_2 + 1/2O_2 + Na_2CO_3 \rightarrow Na_2SO_4 + CO_2 \quad \text{(Rx. X)}$$

followed by Rx. I, or by Rx. VI followed by $$Na_2CO_3 + HCl \rightarrow 2NaCl + H_2O + CO_2. \quad \text{(Rx. XI)}$$

It is preferred to select reactants so as to minimize the types of impurities ultimately added to the body of sodium chloride particles, and to avoid generating strongly acidic by-products. Considering both these criteria, it is preferred to form net reaction products consisting essentially of sodium chloride, calcium sulfate, calcium carbonate, calcium chloride, water, and carbon dioxide.

Where sodium chloride is maintained in a system containing oxygen, water vapor, carbon dioxide, and sulfur dioxide, substantially only the reaction products named in the preceding paragraph are formed by the following procedure: (1) adding to the system, calcium chloride in an amount at least sufficient to react with any sodium sulfate and sodium carbonate present initially; (2) providing in the system, per mole of sulfur dioxide introduced into the system, at least 2 equivalents of a basic anion selected from the group consisting of OH⁻, HCO₃⁻, CO₃⁻², and mixtures thereof, either as NaOH, Ca(OH)₂, NaHCO₃, Na₂CO₃, or CaCO₃; and (3) providing at least one mole of Ca⁺² ion, in addition to any required to react with any sodium sulfate present initially, per 2 equivalents of basic anion provided in the system. Any carbonate ion present in the system initially may be considered in determining the amount of basic anion provided in item (2), and must be considered when determining the minimum amount of calcium required in item (3). Although the amount of calcium required in item (3) is in addition to that required to react with the sodium sulfate initially, any calcium provided to react with sodium carbonate initially may be included.

Where sodium sulfate and carbonate are present initially, as can be readily determined quantitatively by those skilled in the art using well known analytical techniques, the requisite amount of calcium chloride or equivalent must be added before or shortly after the temperature of the particles reaches about 610° C. While caking does not occur instantly at 610° C—at least not to the extent that it is detrimental—some caking is noticeable within minutes, and it becomes severe within about half an hour or less.

Where components are introduced into the system which would otherwise react to form sodium sulfate and/or sodium carbonate, the rate at which any additive is required will of course depend on the rate at which such detrimental components are introduced into the system, as well as the extent to which the body of particles already contains components which can be beneficially employed in reacting to prevent formation of sodium sulfate and carbonate. Once these parameters are evaluated, further additions to the system are made periodically or continuously as necessary to assure that proper reactants are present to maintain the body substantially free from sodium sulfate and sodium carbonate.

The additive may be introduced into the body of sodium chloride particles in any convenient manner. For example, it may be added as an aqueous slurry or solution as the body of sodium chloride approaches operating temperature. Any additive which is hygroscopic such as $CaCl_2 \cdot H_2O$, should not be added until the temperature of the system is sufficiently high so that caking is not caused by moisture. Also, of course, the additive is added as needed after the system has attained operating temperature. In the case of fluidized bed incineration, a preferred embodiment is simply to dissolve or suspend the additive in the waste brine stream prior to introduction of the stream into the incinerator.

V. EXAMPLES

The following examples and comparisons are included to further illustrate the practice of the invention and its advantages over the prior art.

EXAMPLE 1

A sample of sodium chloride was obtained from the bed of a fluidized bed incinerator. The sample was found to contain, by weight, about 96.4 percent sodium chloride, 1.15 percent sodium carbonate, and about 1 percent sodium sulfate, along with other impurities, principally sand.

A 50 gram portion of the sample was treated with 1.32 grams of calcium chloride dihydrate. One portion of the so-treated portion ws observed under hot stage microscopy. Localized melting began at 716° C. Another treated portion of the bed salt was placed in a laboratory scale fluidized bed apparatus and was contacted with a fluidizing gas heated in a tube furnace and having a fluidizing velocity on the order of about one foot per second. The gas was air, supplied by a laboratory compressed air line and filtered prior to introduction into the fluidizing bed apparatus. The bed temperature was maintained for 15 minutes at each of 600° C and 650° C. No sign of caking was observed. As the temperature was further increased, some loss of fluidity was observed at about 700° C.

COMPARISON 1

Using the portion of the sample of bed salt described in Example 1 which was not treated with calcium chloride, the same tests were carried out. Localized melting was observed at temperatures as low as 606° C using hot stage microscopy. In the laboratory fluidized bed apparatus, the bed was fluidized at 600° C, but would not maintain a fluidized condition for extended periods. Addition of 1 percent magnesium oxide enabled fluidization of the bed for about half an hour. As the temperature was increased toward 650° C, caking occurred. Upon reduction of the temperature to about 600° C, the bed refluidized, but loss of fluidization was again realized as the temperature was increased.

COMPARISON 2

A fluidized bed of 99.5 percent pure sodium chloride to which was added 1 percent magnesium oxide, was maintained at 700° C in an inert fluidizing gas with no evidence of caking. When 0.25 weight percent sodium sulfate was added, caking occurred within minutes.

EXAMPLE 2

To a waste brine stream flowing at the rate of about 2700 liters/hour and containing approximately 13 grams of organic carbon per liter, about 13.2 weight percent sodium chloride, and about 0.34 weight percent sodium hydroxide was added 115 liters/hour of an aqueous solution containing 20 weight percent calcium chloride (anhydrous basis). The resulting stream was concentrated, utilizing waste heat recovery, to a slurry containing about 60 weight percent sodium chloride. The concentrated slurry was sprayed into a fluidized bed incinerator having a sodium chloride bed maintained at about 600° C. After 30 hours operation at this bed temperature, the bed temperature was raised to in excess of about 660° C where operation was continued without any indication of loss of fluidization. Accumulated sodium chloride is periodically removed from the bed.

From the foregoing, it can readily be appreciated that maintaining a sodium chloride bed in a fluidized bed incinerator substantially free from sodium sulfate and sodium carbonate impurities enables operation of such an incinerator at higher, more efficient temperatures than heretofore obtainable.

What is claimed is:
1. A method for maintaining a body of particles of sodium chloride free from caking at temperatures within the range of from about 610° C to at least about 700° C in an environment, the body and the environment together comprising a system, where at least one of the following conditions exists, namely,
   1. the body initially contains, in addition, at least one of sodium sulfate or sodium carbonate, or
   2. the environment contains components capable of reacting with at least one of sodium chloride or one another to form at least one of sodium sulfate or sodium carbonate, comprising: maintaining the body of sodium chloride substantially free from sodium sulfate and sodium carbonate within said temperature range by providing in the system an effective amount of at least one compound compris- ing calcium ion to form net reaction products free from sodium sulfate and sodium carbonate.

2. The method of claim 1 wherein the compound(s) provided in the system is (are) selected and provided in amounts such that the net reaction products consist substantially of compounds selected from the group consisting of sodium chloride, calcium chloride, calcium sulfate, calcium carbonate, water, and carbon dioxide.

3. The method of claim 2 wherein the environment contains oxygen, water, carbon dioxide, and sulfur dioxide, and the body of particles is maintained free from caking by:
  a. providing in the system calcium chloride in an amount at least sufficient to react with sodium sulfate and sodium carbonate present in the body of particles, thereby forming calcium sulfate and calcium carbonate;
  b. providing in the system, per mole of sulfur dioxide, at least 2 equivalents of a basic anion selected from the group consisting of $OH^-$, $HCO_3^-$, $CO_3^{-2}$, and mixtures thereof, said anion being provided as NaOH, $Ca(OH)_2$, $NaHCO_3$, $Na_2CO_3$, or $CaCO_3$; and
  c. providing in the system at least one mole of $Ca^{+2}$ ion, in addition to the amount of calcium chloride required in step (a), per two equivalents of basic anion provided in the environment.

4. The method of claim 1 wherein the body of particles is maintained in an environment containing oxygen, water vapor, carbon dioxide, and sulfur dioxide.

5. The method of claim 4 wherein the body of particles is maintained substantially free from sodium sulfate and sodium carbonate by:
  a. adding to the system calcium chloride in an amount at least sufficient to react with sodium sulfate and sodium carbonate present in the body of particles, thereby forming calcium sulfate and calcium carbonate;
  b. providing in the system, per mole of sulfur dioxide, at least 2 equivalents of a basic anion selected from the group consisting of $OH^-$, $HCO_3^-$, $CO_3^{-2}$, and mixtures thereof, said anion being provided as NaOH, $CA(OH)_2$, $NaHCO_3$, $NA_2CO_3$, or $CaCO_3$; and
  c. providing in the environment at least one mole of $Ca^{+2}$ ion, in addition to the amount of calcium chloride required in step (a), per two equivalents of basic anion provided in the environment.

6. The method of claim 5 wherein the body of particles is maintained in a state of turbulent suspension in an upflowing stream of fluidizing gas.

7. The method of claim 6 wherein the basic anion is provided as NaOH and the calcium ion is provided as $CaCl_2$.

8. The method of claim 1 wherein the body of particles initially is substantially free from sodium sulfate and sodium carbonate impurities, but is maintained in an environment containing components capable of reacting with at least one of sodium chloride or one another to form at least one of sodium sulfate or sodium carbonate.

9. The method of claim 8 wherein the body is maintained substantially free from sodium sulfate and sodium carbonate by providing in the system an effective amount of compounds which react to form net reaction products consisting substantially of compounds selected from the group consisting of sodium chloride, calcium chloride, calcium sulfate, calcium carbonate, water, and carbon dioxide.

10. The method of claim 9 wherein the compounds provided in the system are selected from the group consisting of calcium carbonate and calcium hydroxide.

11. The method of claim 9 wherein the body of particles is maintained in a state of turbulent suspension in an upflowing stream of fluidizing gas.

12. The method of claim 1 wherein the body of particles is maintained in a state of turbulent suspension in an upflowing stream of fluidizing gas.

13. The method of claim 1 wherein the body of particles is maintained in an environment inert with respect to the body of particles, but where the body initially contains at least one of sodium sulfate and sodium carbonate as an impurity, and the method comprises adding a sufficient quantity of calcium chloride to the body of particles to react with substantially all of the sodium sulfate and sodium carbonate present.

14. In a process for disposal of aqueous sodium chloride brine streams containing organic matter, of the type wherein the organic matter is oxidized in a fluidized bed reactor having a bed containing granular sodium chloride held in a fluidized state by an upflowing stream of gases from the conbustion of sulfur-containing fuels, the improvement which comprises: maintaining the bed of sodium chloride substantially free from sodium sulfate and sodium carbonate at temperatures within the range of from about 610° C to at least about 700° C by providing in the reactor an effective amount of at least one compound comprising calcium ion to react with sodium sulfate and sodium carbonate present and with additional components in the stream of gases which would otherwise react to form either of sodium sulfate or sodium carbonate.

15. The improvement of claim 14 which comprises:
  a. adding to the reactor calcium chloride in an amount at least sufficient to react with sodium sulfate and sodium carbonate present in the body of particles, thereby forming calcium sulfate and calcium carbonate;
  b. providing in the reactor, per mole of sulfur dioxide, at least 2 equivalents of a basic anion selected from the group consisting of $OH^-$, $HCO_3^-$, $CO_3^{-2}$, and mixtures thereof, said anion being provided as NaOH, $Ca(OH)_2$, $NaHCO_3$, $Na_2CO_3$, or $CaCO_3$; and
  c. providing in the reactor at least one mole of $Ca^{+2}$, in addition to the amount of calcium chloride required in step (a), per 2 equivalents of basic anion provided in the system.

16. The improvement of claim 15 wherein the base is provided as NaOH and the calcium is provided as $CaCl_2$.

17. The improvement of claim 14 wherein the bed is maintained at a temperature within the range of from about 650° C to about 680° C.

18. A system comprising a bed of particles of granular sodium chloride maintained in a state of turbulent suspension at a temperature within the range of from about 610° C to about 700° C in an upflowing stream of fluidizing gas, wherein the fluidizing gas contains water vapor, oxygen, and sulfur dioxide and wherein there is provided in the system a sufficient quantity of a calcium reactant to react with the sulfur dioxide, oxygen, and water to form calcium sulfate so that the system is maintained substantially free from sodium sulfate.

19. The system of claim 18 into which is continuously introduced a liquid containing aqueous sodium chloride and organic matter.

20. The system of claim 9 wherein the liquid also contains sodium hydroxide and calcium chloride.

21. A method for maintaining a body of particles of sodium chloride free from caking at temperatures within the range of from about 610° C to at least about 700° C comprising:

a. providing a stream of hot gases containing sulfur dioxide and having a temperature sufficient to maintain the body of particles within the recited temperature range;

b. removing the sulfur dioxide from the hot gas stream; and c. contacting the body of sodium chloride with the hot sulfur-dioxide-free gas.

* * * * *

UNITED STATES PATENT AND TRADEMARK OFFICE
CERTIFICATE OF CORRECTION

PATENT NO. : 4,038,188
DATED : July 26, 1977
INVENTOR(S) : James A. May, Sr., et al.

It is certified that error appears in the above-identified patent and that said Letters Patent are hereby corrected as shown below:

In column 1, line 13, delete "in" and insert --is--.

In column 2, line 46, delete "priciples" and insert --principles--.

In column 5, line 40, delete "tainedoperating" and insert --tained operating--.

In column 6, line 64, after sodium carbonate go to the margin and put the word comprising, etc.

In column 7, line 44, delete "CA(OH)$_2$" and insert --Ca(OH)$_2$-- and delete also "NA$_2$CO$_3$" and insert --Na$_2$CO$_3$.

*Signed and Sealed this*

*Twenty-fifth* Day of *October 1977*

[SEAL]

Attest:

RUTH C. MASON
*Attesting Officer*

LUTRELLE F. PARKER
*Acting Commissioner of Patents and Trademarks*